United States Patent
Chung et al.

(10) Patent No.: US 7,519,286 B2
(45) Date of Patent: Apr. 14, 2009

(54) APPARATUS OF DRIVING LENS FOR FOCUSING

(75) Inventors: Yu-Fen Chung, Hsinchu (TW); Tsung-Kai Chang, Hsinchu Hsien (TW); Chin-Sung Liu, Hsinchu (TW)

(73) Assignee: TopRay Technologies, Inc., Hsinchu (TW)

( * ) Notice: Subject to any disclaimer, the term of this patent is extended or adjusted under 35 U.S.C. 154(b) by 379 days.

(21) Appl. No.: 11/456,859

(22) Filed: Jul. 12, 2006

(65) Prior Publication Data

US 2007/0154201 A1    Jul. 5, 2007

(30) Foreign Application Priority Data

Jan. 5, 2006    (TW) .............................. 95200234 U

(51) Int. Cl.
G03B 3/00    (2006.01)

(52) U.S. Cl. ..................... 396/133; 369/44.15; 396/542

(58) Field of Classification Search ................... 396/79, 396/133, 542; 359/696, 809, 814, 824; 348/357
See application file for complete search history.

(56) References Cited

U.S. PATENT DOCUMENTS

| 2004/0130808 A1* | 7/2004 | Yoneyama et al. | 359/814 |
| 2005/0099898 A1* | 5/2005 | Nogami et al. | 369/44.15 |

* cited by examiner

Primary Examiner—Christopher E Mahoney
Assistant Examiner—Autumn Parker

(57) ABSTRACT

An apparatus of auto-focusing is provided, including an outer holder, a wire set, a magnet set and an inner-holder. The magnet set is fixed at the corners inside the outer-holder. The inner-holder is a hollow cylinder surrounded by a coil. The wire set is connected to the top and the bottom ends of the outer-holder. The other end of the wire set is connected to the outer circumference of the inner-holder. Therefore, the inner-holder is a hanging moveable component, which can move vertically when the electrical current flows through the coil to achieve the object of auto-focusing.

4 Claims, 4 Drawing Sheets

APPARATUS OF DRIVING LENS FOR FOCUSING

FIELD OF THE INVENTION

The present invention generally relates to an apparatus for lens of mobile phones, and more specifically to an apparatus for counteracting the gravity effect when driving the lens of mobile phones for auto-focusing.

BACKGROUND OF THE INVENTION

The mobile phones bring much convenience to the people for long distance communication. As the technology progresses, more and more functions are added to the mobile phones. In addition to the audio communication, functions, such as photography, audio recording, music playing, and video viewing, are all added to list of options of mobile phones. Some of the above functions, such as photography, are so common that they are becoming an integral part of a mobile phone. More and more users are using their mobile phone as a camera. Therefore, improved functions, such as high-pixel pictures and auto-focusing, are considered as essential to the ease of use while posing severe restriction on the thin design of the mobile phone.

The auto-focusing of the mobile phone camera is to control the movement of the camera lens. The current approach to control the focus of the lens in a mobile phone is to use a stepping motor, which increases the manufacturing cost. Therefore, it is important to develop an apparatus for driving the lens of a mobile phone for auto-focusing that can reduce the manufacturing cost.

SUMMARY OF THE INVENTION

The present invention has been made to overcome the above-mentioned drawback of conventional apparatus for driving lens for focusing. The primary object of the present invention is to provide an apparatus for driving the lens of a mobile phone for focusing. The present invention is stable in structure and inexpensive in manufacturing. The structure of the present invention is small and light-weighted for using in mobile phone.

To achieve the above object, the present invention provides an auto-focusing apparatus, including an outer holder, a wire set, a magnet set and an inner-holder.

The magnet set is fixed at the corners inside the outer-holder. The inner-holder is a hollow cylinder surrounded by a coil. The wire set is connected to the top and the bottom ends of the outer-holder. The other end of the wire set is connected to the outer circumference of the inner-holder. Therefore, the inner-holder is a hanging moveable component, which can move vertically when the electrical current flows through the coil.

According to the conventional techniques, the movement of the inner-holder is controlled by a stepping motor. The present invention uses a voice coil motor (VCM) to replace the stepping motor for controlling the movement. Because the VCM is smaller and less expensive, and has a shorter response time, the apparatus of the present invention provides an alternative that is competitive in market.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
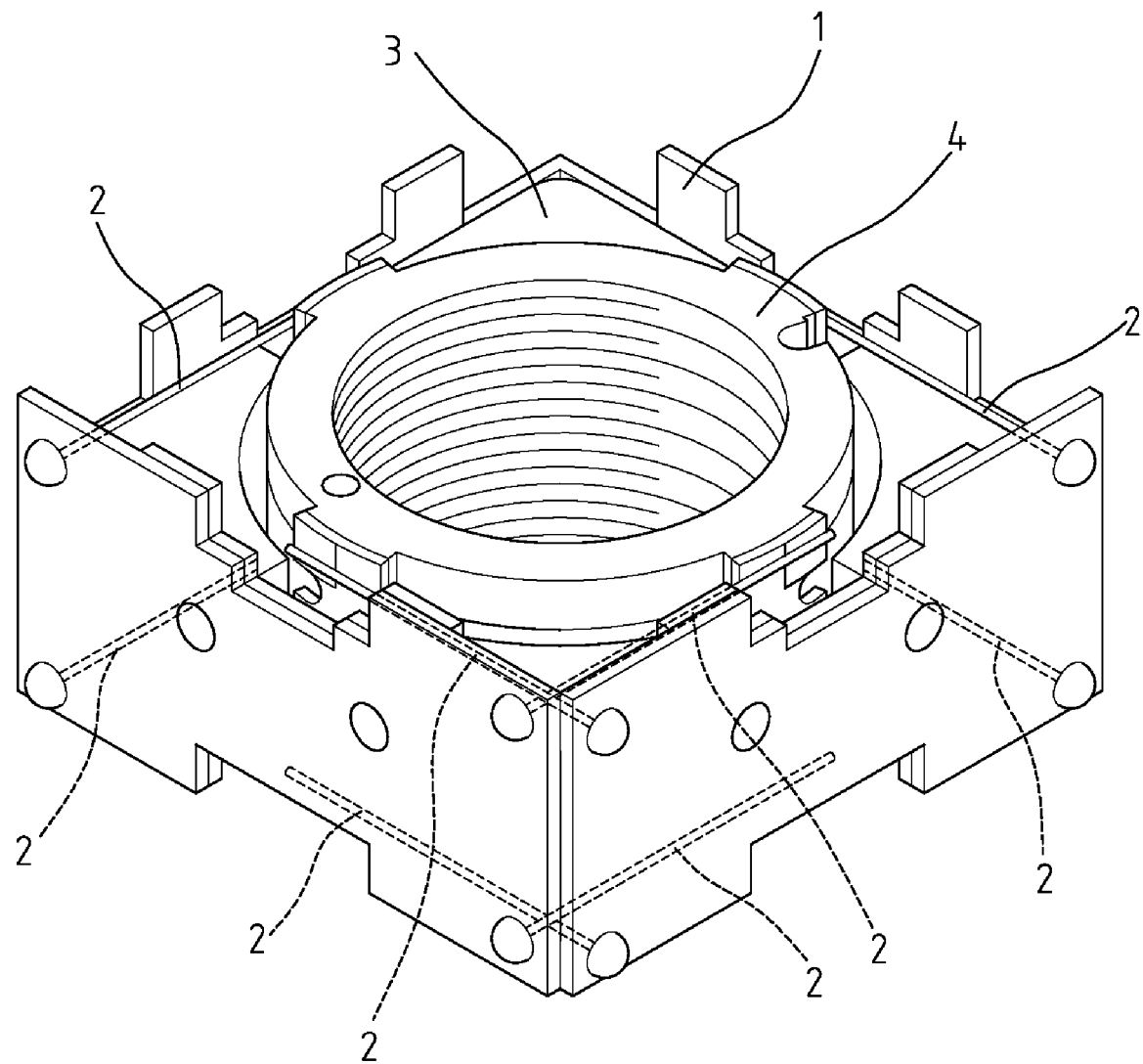
FIG. 1 shows a three-dimensional view of the present invention.

FIG. 1 shows the three-dimensional view of the present invention, including an outer-holder 1, a wire set 2, a magnet set 3, and an inner-holder 4. Wire set 2 is placed inside outer-holder 1, and indicated as dash line to show the location inside outer-holder 1.

Figure 2:
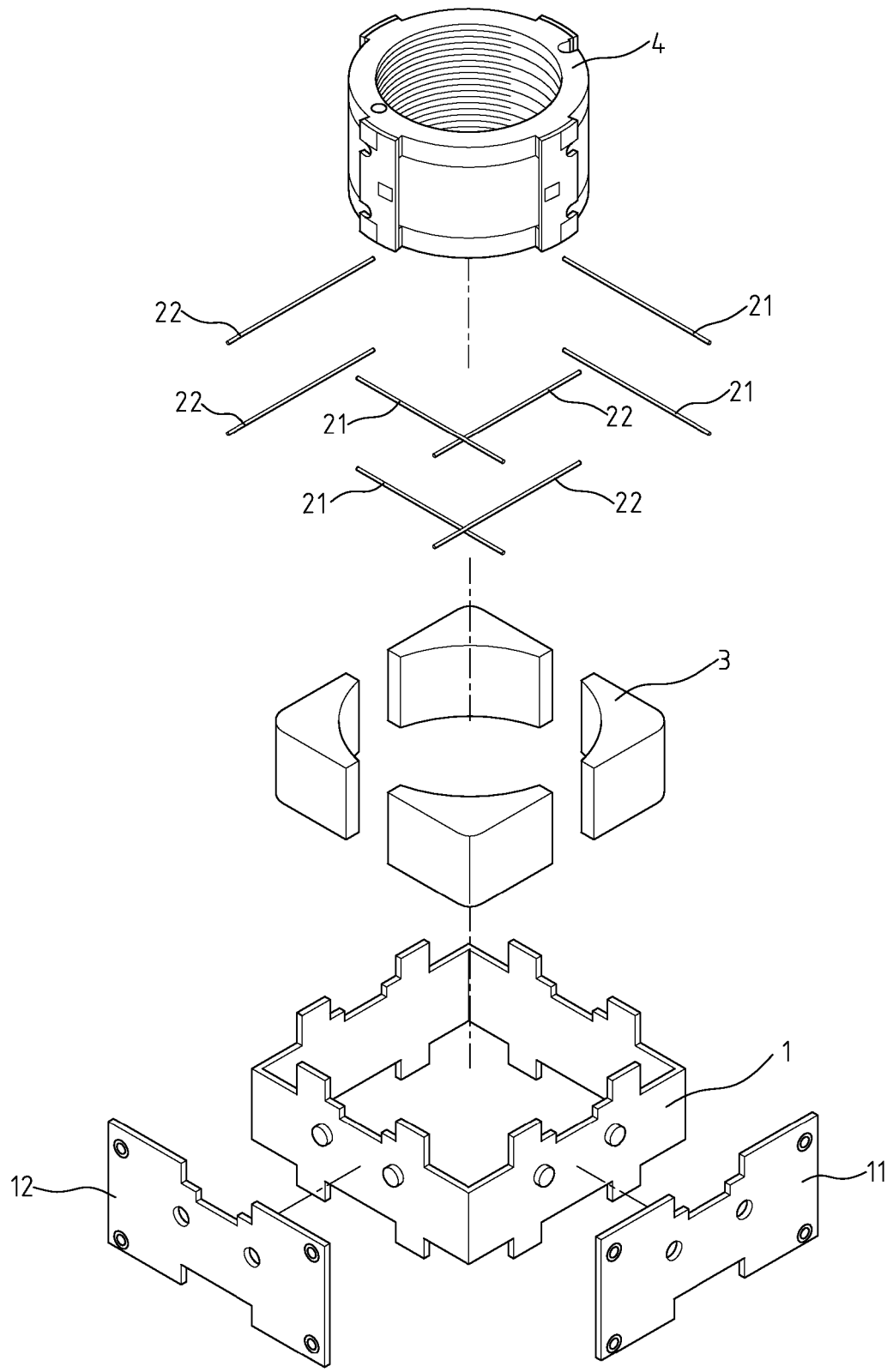
FIG. 2 shows an exploded view of the elements of the present invention.
Figure 3:
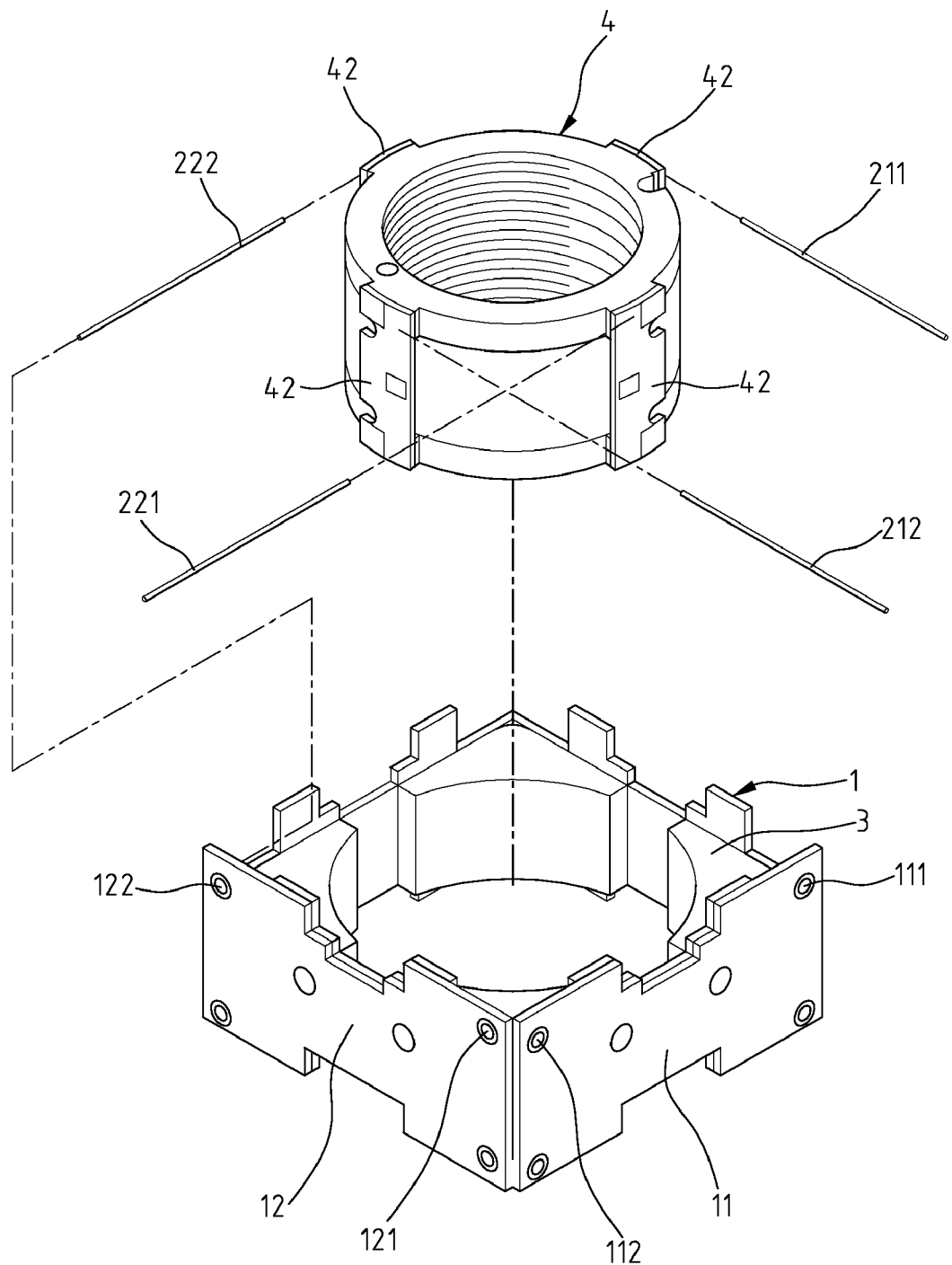
FIG. 3 shows a schematic view of the relative position of the elements of the present invention.
Figure 4:
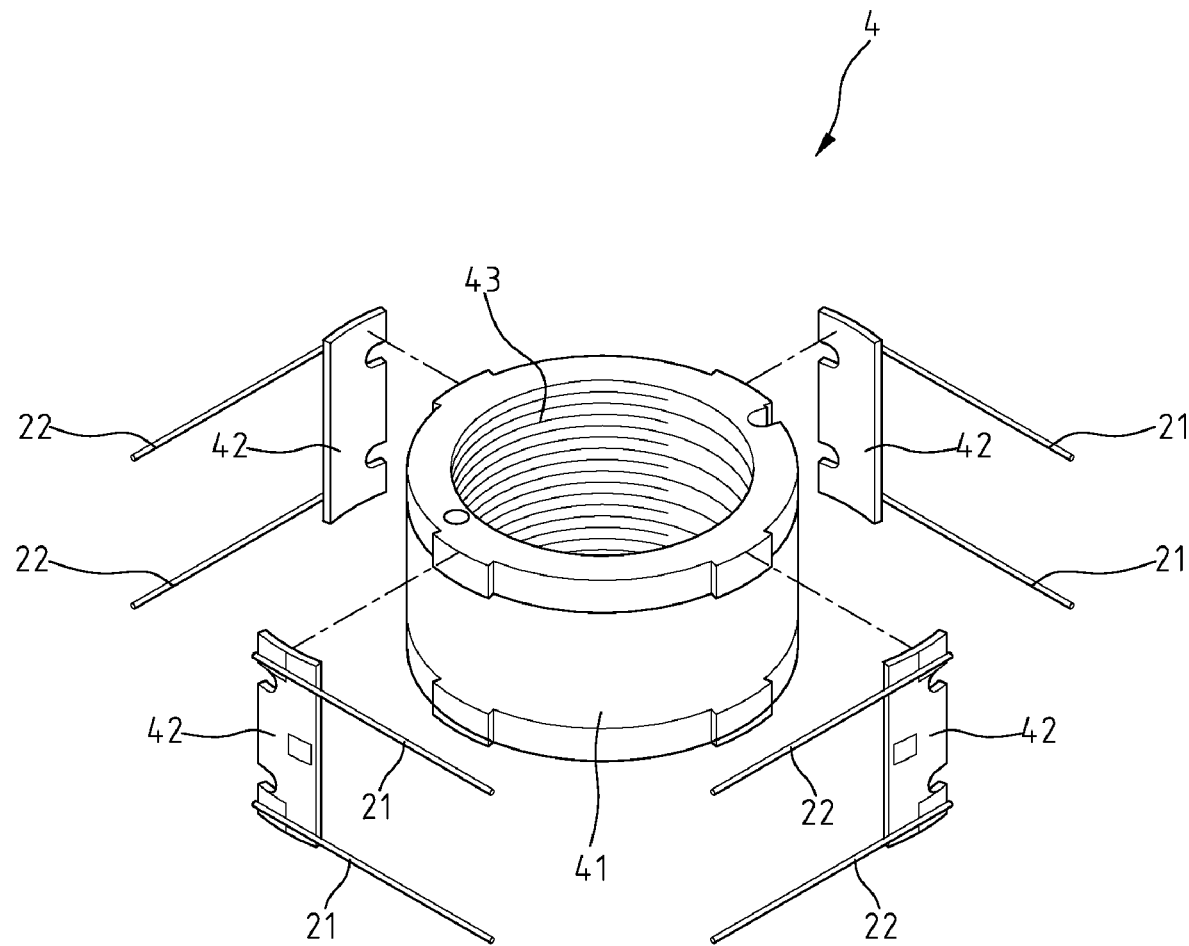
FIG. 4 shows a detailed view of the inner-holder and the wire set of the present invention.

FIG. 2 shows an exploded view of FIG. 1. Outer-holder 1 further includes a pair of printed circuit board (PCB) 11, 12, used as a fixed end of wire set 2. Wire set 2 includes a plurality of wires. The wires are divided into at least two groups, with all the wires in a group being arranged in parallel. Each wire group must include at least two wires. The embodiment in FIG. 2 shows that 8 wires are used, and divided into two groups 21, 22, with each group having four wires. Magnet set 3 is attached or fixed at the corners inside outer holder 1, as shown in FIG. 3. The hollow of inner-holder 4 is for housing a lens. Inner holder 4 is covered with a coil 41 and a plurality of PCB 42 on the outer surface, as shown in FIG. 4.

FIG. 3 shows the relative position of the elements of the present invention. PCB 11, 12 are fixed to the outer surface of outer-holder 1 and are arranged 90° apart. PCB 11, 12 are perpendicular to each other. Each PCB 11, 12 includes a plurality of holes for hooking wire groups 21, 22 (not shown in the figure). Magnet set 3 is fixed to the corners inside of outer-holder 1.

For simplicity, only two wires in each group are shown in FIG. 3 for explanation. Including more wires in each group will result in higher stability for the auto-focusing. As shown in FIG. 3, there are four PCB 42 placed symmetrically around the outer surface of the inner-holder 4. Wires 211 and 212 each have one end fixed at one of two opposite PCB 42, and wires 221 and 222 each have one end fixed at one of the other two opposite PCB 42.

Wire group 21 includes wires 211, 212, and wire group 22 includes wires 221, 222. Wires 211, 212 are parallel to each other, and wires 221, 222 are parallel to each other. Wire group 21 is not parallel to wire group 22. In this embodiment, wire group 21 is perpendicular to wire group 22. One end of wires 211, 212, 221, 222 is soldered to PCB 42 on the outer surface of inner-holder 4. The other end of wires 211, 212, 221, 222 is fixed to the holes 111, 112, 121, 122 of PCB 11, 12, respectively. The arrangement of each wire group having four wires is similar, as shown in FIG. 4.

Inner-holder 4 is placed inside outer-holder 1 with magnet set 3. One end of each wire of wire set 2 is soldered to PCB 11 or PCB 12 on the outer surface of outer-holder 1, and the other end is fixed at one of PCB 42 on the outer surface of the inner-holder 4. As shown in FIG. 4, each wire of wire group 21 is soldered to a first pair of PCB 42 and each wire group of 22 is soldered to second pair PCB 42 that is perpendicular to the first pair. As a result, the two wire groups are perpendicular to each other. Through the rigidity of wire set 2, inner-holder 4 is a hanging moveable element inside out-holder 1. It is important to note that because wire group 21 is perpendicular to wire group 22, inner-holder 4 is supported horizontally in a stable manner for moving along the vertical axis. With the wire ends of the perpendicular wires fixed around the symmetrically distributed PCB 42, inner-holder 4 does not tilt when it moves along the vertical axis.

In summary, the auto-focusing apparatus of the present invention uses magnet set 3 inside outer-holder 1 to provide magnetic field and coil 41 on inner-holder 4 to generate a force for vertical movement when the electrical current flows through coil 41. The force controls the movement of the lens inside inner-holder 4 so that it will auto-focus along the vertical axis. The force of movement comes from a VCM. Because the VCM is small and less expensive and has a short response time, the auto-focusing apparatus of the present invention is smooth and fast.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus of driving lens for focusing, comprising:
   an outer-holder with a magnet set placed inside said outer-holder, and at least first and second outer printed circuit boards placed perpendicular to each other outside said outer-holder;
   an inner-holder having a hollow cylinder for housing a lens and an outside covered by a coil, and at least first, second, third and fourth inner printed circuit boards fixed around said inner-holder symmetrically with said first and third inner printed circuit boards positioned along a first axis and said second and fourth inner printed circuit boards positioned along a second axis substantially perpendicular to said first axis;
   a first wire group including a plurality of wires each having one end fixed to said first or third inner printed circuit board and the other end fixed to said first outer printed circuit board; and
   a second wire group including a plurality of wires each having one end fixed to said second or fourth inner printed circuit board and the other end fixed to said second outer printed circuit board.

2. The apparatus as claimed in claim 1, wherein said wires of said first wire group are perpendicular to said wires of said second wire group.

3. The apparatus as claimed in claim 1, wherein said wires of said first wire group are non-parallel to said wires of said second wire group.

4. The apparatus as claimed in claim 1, wherein said inner-holder is a hanging moveable element.

\* \* \* \* \*